United States Patent
Cho et al.

(10) Patent No.: US 8,045,281 B2
(45) Date of Patent: *Oct. 25, 2011

(54) METHOD OF SETTING WRITE FACTOR IN HARD DISK DRIVE AND HARD DISK DRIVE USING THE SAME

(75) Inventors: Sung-youn Cho, Suwon-si (KR); Keung-ho Hong, Osan-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 733 days.

This patent is subject to a terminal disclaimer.

(21) Appl. No.: 12/029,719

(22) Filed: Feb. 12, 2008

(65) Prior Publication Data

US 2008/0198491 A1    Aug. 21, 2008

(30) Foreign Application Priority Data

Feb. 16, 2007   (KR) .................. 10-2007-0016798

(51) Int. Cl.
*G11B 27/36* (2006.01)
(52) U.S. Cl. ........................................................ 360/31
(58) Field of Classification Search .................. 360/75, 360/31, 110, 313
See application file for complete search history.

(56) References Cited

U.S. PATENT DOCUMENTS

| | | | | |
|---|---|---|---|---|
| 5,406,422 | A * | 4/1995 | LaManna | 360/2 |
| 6,310,740 | B1 | 10/2001 | Dunbar et al. | |
| 7,016,136 | B2 * | 3/2006 | Shiratori et al. | 360/69 |
| 7,483,234 | B2 * | 1/2009 | Shimozato | 360/75 |
| 7,525,307 | B2 * | 4/2009 | Shen | 324/210 |
| 2005/0078393 | A1 * | 4/2005 | Cho | 360/31 |
| 2008/0198492 | A1 * | 8/2008 | Ahn | 360/31 |

FOREIGN PATENT DOCUMENTS

| | | |
|---|---|---|
| JP | 9-102103 | 4/1997 |
| JP | 9-138926 | 5/1997 |

\* cited by examiner

*Primary Examiner* — Fred Tzeng
(74) *Attorney, Agent, or Firm* — Stanzione & Kim, LLP

(57) ABSTRACT

A method of setting write factors of each head in a hard disk and a hard disk drive using the method. The method includes writing a write signal onto a test track based on a write factor initially set on the magnetic head, writing the write signals onto the tracks adjacent to the test track, measuring the write quality of the test track, changing the write factor of the magnetic head and repeating the writing of the write signal onto the test track, and setting a write factor of the magnetic head by selecting the write factor corresponding to an optimum write quality from among the write qualities of the write factors of the test track.

20 Claims, 5 Drawing Sheets

METHOD OF SETTING WRITE FACTOR IN HARD DISK DRIVE AND HARD DISK DRIVE USING THE SAME

CROSS-REFERENCE TO RELATED APPLICATIONS

This application claims the benefit of Korean Patent Application No. 10-2007-0016798, filed on Feb. 16, 2007, in the Korean Intellectual Property Office, the disclosure of which is incorporated herein in its entirety by reference.

BACKGROUND OF THE INVENTION

1. Field of the Invention

The present general inventive concept relates to a method of setting a write factor in a hard disk drive and a hard disk drive using the same, and more particularly, to a method of separately setting a write factor of each of the magnetic heads in a hard disk drive and a hard disk drive using the same.

2. Description of the Related Art

A hard disk drive is a data storing apparatus that reproduces/records data in/from a disk using a magnetic head in order to assist the operation of a computer.

In the hard disk drive, a servo signal is written based on a write factor set in the magnetic head. However, in a conventional hard disk drive, an identical write factor is set for all magnetic heads. In this case, if a magnetization characteristic between the magnetic heads is different, the write quality of the servo signal is degraded. For example, if the servo signal is written using a magnetic head having a good magnetization characteristic, the servo signal written in a target track can affect adjacent tracks. As a result, the write quality of the adjacent tracks can be degraded. Also, if a servo signal is written using a magnetic head having a poor magnetization characteristic, the write quality of the servo signal written on the target track can be degraded.

SUMMARY OF THE INVENTION

The present general inventive concept provides a method of setting a write factor of each magnetic head in a hard disk drive.

The present general inventive concept also provides a hard disk drive in which write factors of each magnetic head may be separately set.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing a method of setting a write factor of a magnetic head of a hard disk drive, the method including writing a write signal onto a test track based on a write factor initially set on the magnetic head, writing the write signal onto tracks adjacent to the test track, measuring the write quality of the test track, changing the write factor of the magnetic head in accordance with the write quality of the test track and repeating the writing of the write signal onto the test track based on the changed write factor, and setting the write factor of the magnetic head to correspond to an optimum write quality from among the measured write qualities of the test track.

The tracks adjacent to the test track may be located on both sides of the test track.

The writing of the write signals onto the tracks adjacent to the test track may comprise writing the write signals onto the tracks adjacent to the test track using the write factor initially set on the magnetic head.

The writing of the write signals onto the tracks adjacent to the test track may comprise writing the write signals N times on the tracks adjacent to the test track, where N is an integer greater than 2.

The write factor may be a write current.

The repeating of the writing by changing the write factor may comprise repeating the writing of the write signal onto the test track by increasing the write current.

The write signal may be a servo signal.

The write quality of the test track may be bit error rate (BER).

The foregoing and/or other aspects and utilities of the present general inventive concept may also be achieved by providing a method of setting a write factor of a hard disk drive comprising a plurality of magnetic heads, wherein the write factor may be changed by increasing or decreasing a write current based on a magnetization characteristic of each magnetic head.

After the optimum write factor for one of the magnetic heads is set, the optimum write factors for the other magnetic heads may be sequentially set.

The write signals may be simultaneously written to a plurality of test tracks using the plurality of magnetic heads.

The foregoing and/or other aspects and utilities of the present general inventive concept may also be achieved by providing a hard disk drive, including a plurality of magnetic heads to write write signals onto tracks based on a write factor corresponding to each magnetic head, and a plurality of write control units to respectively store the corresponding write factors of the magnetic heads, wherein, after writing the write signals onto a test track and onto the tracks adjacent to the test track using each of the magnetic heads, the write factors of each magnetic head are set in accordance with a write quality of the test track, and the set write factors are stored in the corresponding write control units.

The write control units may comprise resistors that store the write factors.

The write signals may be simultaneously written onto a plurality of tracks based on the write factors of the magnetic heads, and wherein the write factors are different from each other.

The foregoing and/or other aspects and utilities of the present general inventive concept may also be achieved by providing a method of setting a write factor of a hard disk drive comprising a plurality tracks, the method including writing write signals onto each of the tracks based on a write factor initially set to the tracks, writing the write signals onto adjacent tracks, measuring a write quality of each track, changing the write factors in accordance with the measured write quality and repeating the writing of the write signals onto each of the tracks and adjacent tracks based on the changed write factors, and setting write factors of the tracks to correspond to an optimum write quality from among the write qualities of each track.

The write factors may be set in a plurality of zones, wherein each zone comprises at least one track.

The foregoing and/or other aspects and utilities of the present general inventive concept may also be achieved by providing a method of setting a write factor of a magnetic head, the method including writing a write signal onto a test track and at least one adjacent track based on a preset write factor of the magnetic head, measuring the write quality of the test track, adjusting the write factor of the magnetic head in accordance with the write quality of the test track, and setting the write factor of the magnetic head based on the adjusted write factor.

The method may further include repeating the writing of the write signal and the measuring of the write quality a predetermined number of times, wherein the adjusting of the write factor is performed after the write signal is written the predetermined number of times, and wherein the setting of the write factor corresponds to an optimum write quality selected from among the predetermined number of write quality measurements.

The write factor may be adjusted by increasing or decreasing a write current by a predetermined amount.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
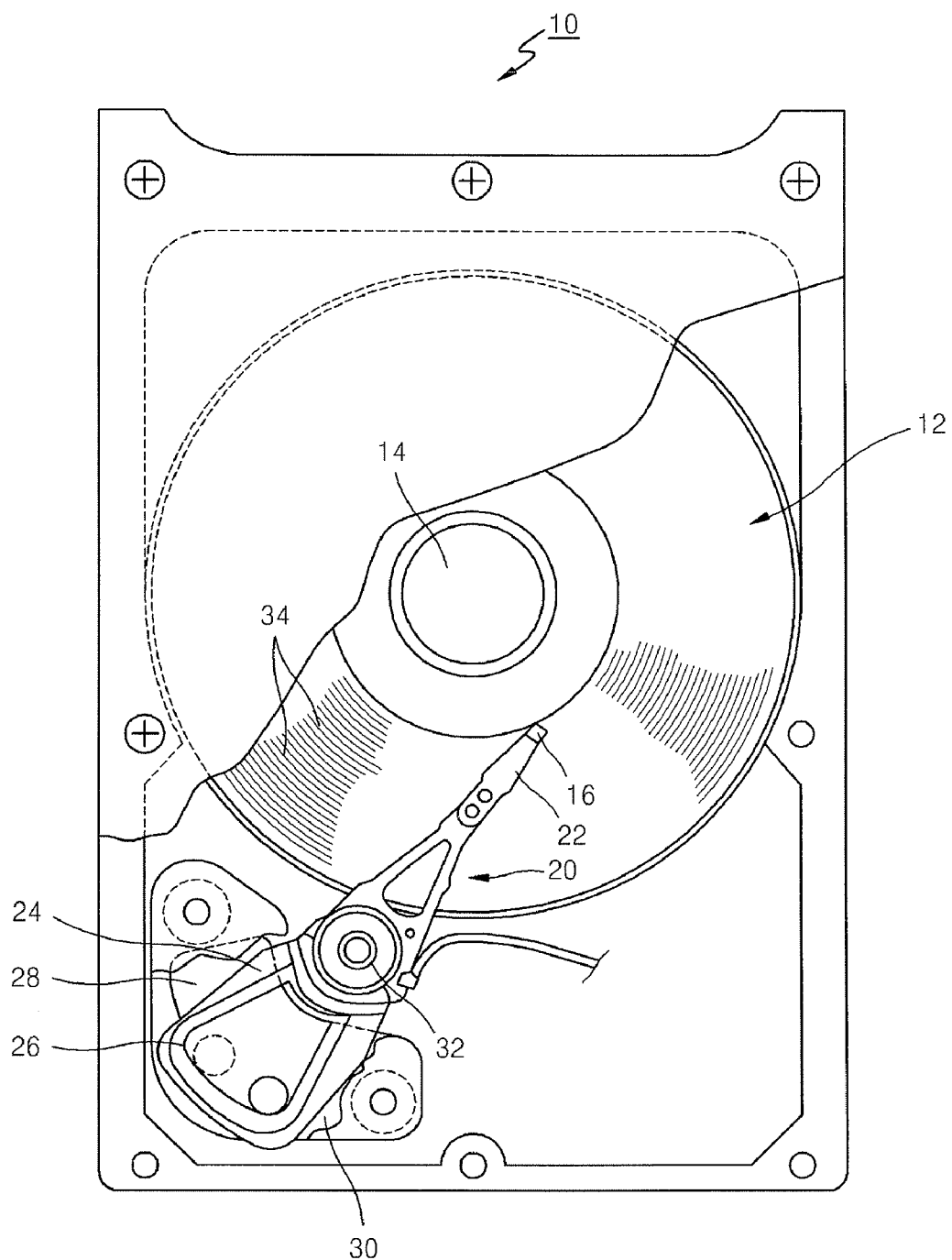
FIG. 1 is a plan view illustrating a head disk assembly of a hard disk drive according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A hard disk drive (HDD) may be formed of a head disk assembly (HDA) comprised of various components and an electric circuit.

FIG. 1 is a plan view of a HDA 10 of a hard disk drive in which an embodiment of the present general inventive concept may be used. The HDA 10 may include at least one magnetic disk 12 which may be rotated by a spindle motor 14. The HDA 10 may also include a converter (not illustrated) located close to a surface of the magnetic disk 12.

The converter can read or write information from or on the magnetic disk 12 by detecting a magnetic field on the magnetic disk 12 or magnetizing the magnetic disk 12. Typically, the converter is combined with the surface of the magnetic disk 12. Here, although a single converter may be described in terms of an embodiment of the present general invention concept, it is understood that the converter may also include a write converter, that is, a writer to magnetize the magnetic disk 12, and a read converter, that is, a reader to detect a magnetic field on the magnetic disk 12. It is also understood that the reader may take the form of a magneto-resistive (MR) device.

The converter can be integrated into a magnetic head 16 having a structure that generates an air bearing between the converter and the surface of the magnetic disk 12. The magnetic head 16 may be integrated into a head stack assembly (HSA) 22. The HSA 22 may be attached to an actuator arm 24 having a voice coil 26. The voice coil 26 may be located close to a magnetic assembly 28 to define a voice coil motor 30. A current supplied to the voice coil 26 may generate a torque to rotate the actuator arm 24 with respect to a bearing assembly 32. The rotation of the actuator arm 24 may move the converter across the surface of the magnetic disk 12.

In conventional hard disk drives, information is typically stored in circular tracks 34 of the magnetic disk 12. Each track 34 generally includes a plurality of sectors, wherein each sector includes a data field and a servo field. In the servo field, a preamble, a servo address/index mark (SAM/SIM), and a grey code and bursts A, B, C, and D may be recorded. The converter may move across the surface of the magnetic disk 12 to read or write information from or onto the magnetic disk 12.

Figure 2:
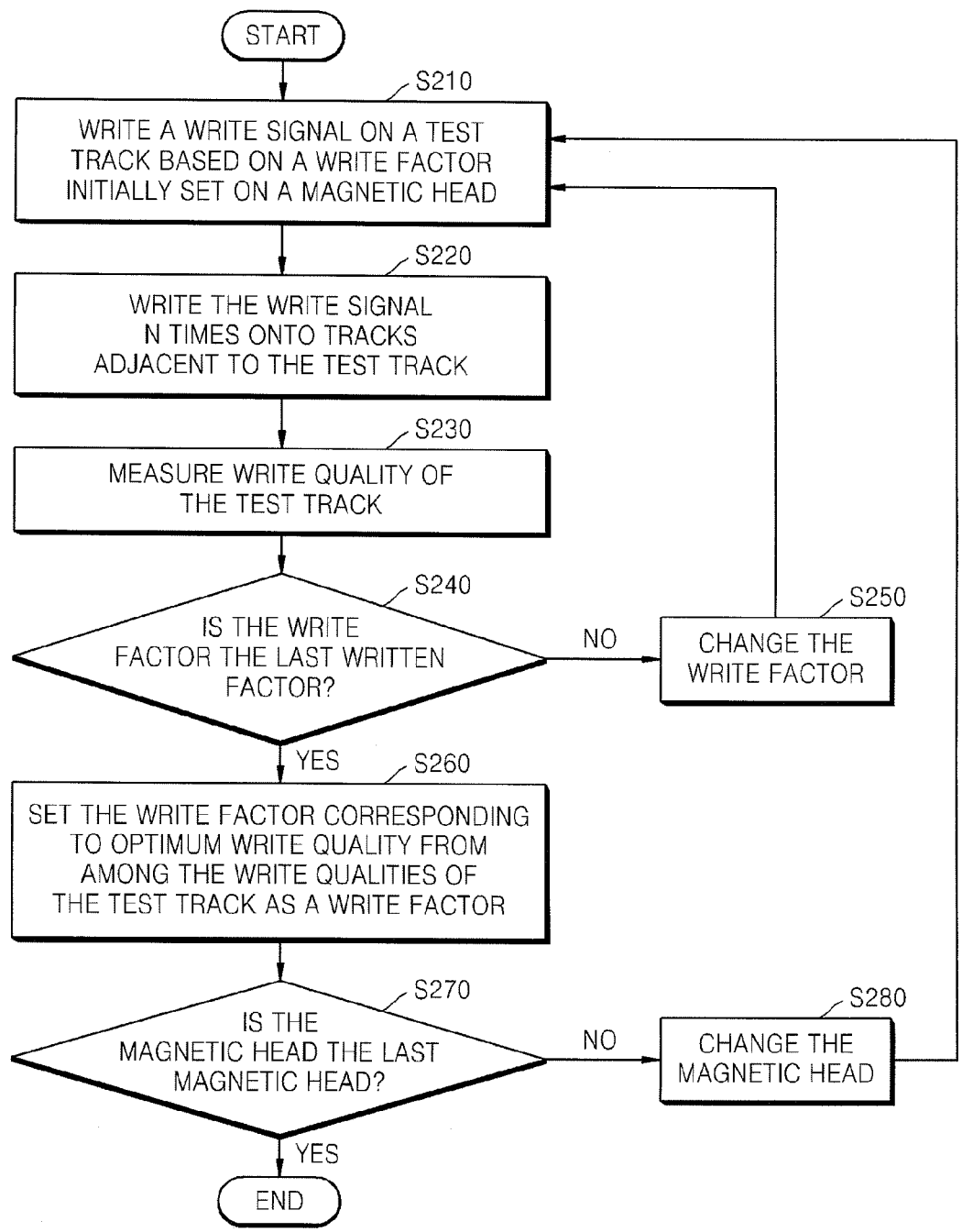
FIG. 2 is a flow chart illustrating a method of separately setting a write factor of each head in a hard disk drive, according to an embodiment of the present general inventive concept.

FIG. 2 is a flow chart of a method of setting a write factor of each head in a hard disk drive according to an embodiment of the present general inventive concept.

Referring to FIG. 2, the method of setting a write factor according to an embodiment of the present general inventive concept may include writing a write signal on a test track based on a preset write factor that has been initially set on a magnetic head (operation S210), writing a write signal onto tracks adjacent to the test track (operation S220), measuring write quality of the test rack (operation S230), and changing the write factor (operation S250). Based on the changed write factor, the method of setting a write factor according to an embodiment of the present general inventive concept may re-perform the writing of a write signal on a test track based on a write factor initially set on a magnetic head (operation S210) through the measuring of write quality of the test rack (operation S230).

The write factor may be a write current. The changing of the write factor (operation S250) may increase a previous write current by a predetermined amount. Accordingly, the writing of a write signal on a test track (operation S210) can write a write signal onto the test track based on the write current increased by a predetermined amount.

The write signal may be a servo signal. In the above operations S210, S220, and S230, the servo signal can be written in the test track and the tracks adjacent to the test track.

The method of setting a write factor according to the present embodiment may include setting a write factor of the magnetic head to correspond to the optimum write quality from among the write qualities of the tracks (operation S260). Thus, the method of setting a write factor according to an embodiment of the present general inventive concept can set the write factors suitable for the characteristics of each of the magnetic heads, by separately setting the write factor of each of the magnetic heads. For example, if the magnetic head is determined to have a good magnetization characteristic, a low write factor, for example, a write current having a small amount of current, can be set. Thus, a servo signal written onto a target track may be prevented from affecting tracks adjacent to the target track. Likewise, if the magnetic head is determined to have a poor magnetization characteristic, a high write factor, for example, a write current having a large amount of current, can be set. Thus, the write quality of the servo signal of the target track can be protected from degrading.

Referring to FIG. 2, the method of setting a write factor according to an embodiment of the present general inventive concept can further include changing the magnetic head (operation S280). That is, after an optimum write factor is set for one magnetic head through the previous operations S210 through S260, the optimum write factors of the other magnetic heads included in the hard disk drive can be set.

Figure 4:
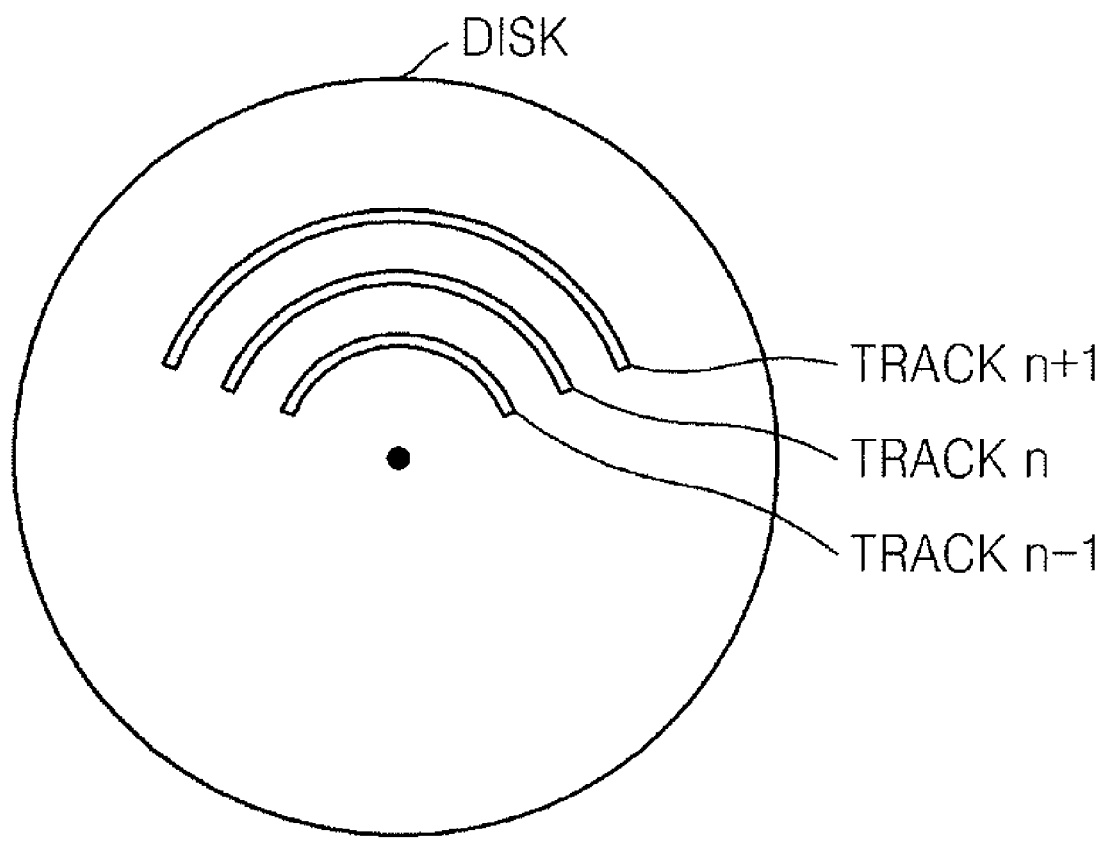
FIG. 4 is a schematic drawing illustrating a test track and adjacent tracks in a method of setting a write factor of FIG. 2, according to an embodiment of the present general inventive concept.

In the operation of writing write signals onto the tracks adjacent to the test track (operation S220), the tracks adjacent to the test track may be tracks located adjacent to both sides of the test track. For example, in FIG. 4, if the test track is TRACK n, the adjacent tracks can be TRACK n−1 and TRACK n+1.

In the operation of writing the write signals onto the tracks adjacent to the test track (operation S220), the write signals can be written twice or more times onto the tracks adjacent to the test track. More specifically, after writing the write signals twice onto the tracks adjacent to the test track, the write quality, for example, the variation of a bit error rate (BER), of the test track according to the writing times may be measured. Thus, the affect of the write signals written onto the tracks adjacent to the test track regarding the write quality of the write signal of the test track can be determined. The write quality of the test track may be the BER.

In the operation of writing the write signals onto the tracks adjacent to the test track (operation S220), write signals can be written onto the tracks adjacent to the test track using the write factor initially set in the magnetic head. That is, the write signals can be written onto the tracks adjacent to the test track using a write factor identical to the write factor applied to the test track.

Figure 3:
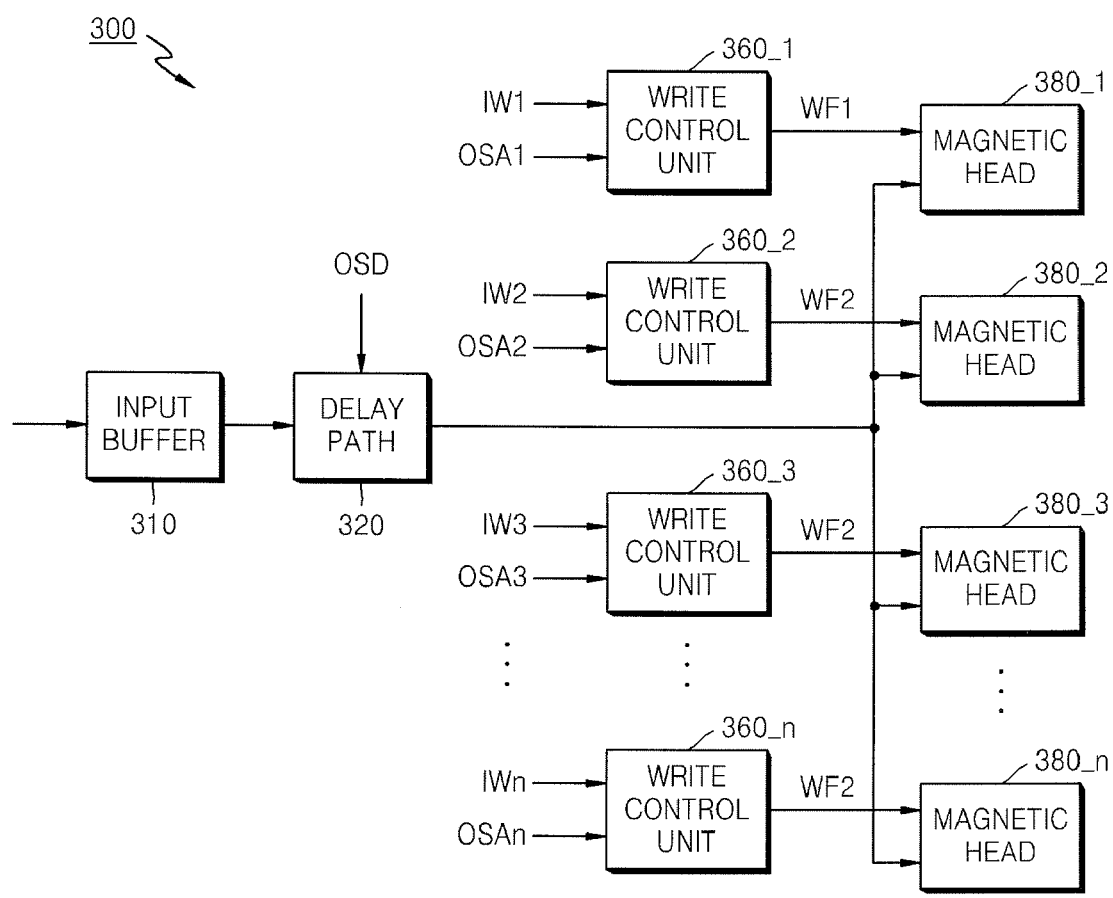
FIG. 3 is a block diagram illustrating a hard disk drive to separately set a write factor of each head according to an embodiment of the present general inventive concept.

FIG. 3 is a block diagram illustrating a hard disk drive 300 to separately set a write factor of each magnetic head according to an embodiment of the present general inventive concept.

Referring to FIG. 3, the hard disk drive 300 may include a plurality of magnetic heads 380_1 through 380_n and a plurality of write control units 360_1 through 360_n. Each of the magnetic heads 380_1 through 380_n may write the write signals onto tracks based on corresponding write factors WF1 through WFn. Each of the write control units 360_1 through 360_n may store the write factors WF1 through WFn on the corresponding magnetic heads 380_1 through 380_n.

The hard disk drive 300 according to an embodiment of the present general inventive concept may write the write signals onto the test track and the tracks adjacent to the test track using each of the magnetic heads 380_1 through 380_n. Afterwards, write factors WF1 through WFn of each of the magnetic heads 380_1 through 380_n may be set based on the write quality of the test track and stored in the corresponding write control units 360_1 through 360_n. The write control units 360_1 through 360_n can include a resistor to store the write factors WF1 through WFn.

The hard disk drive 300 according to an embodiment of the present general inventive concept can write the write signals in a plurality of tracks at the same time, based on the write factors WF1 through WFn of the magnetic heads 380_1 through 380_n, respectively. For example, the hard disk drive 300 can simultaneously write the write signals onto a plurality of tracks of a bank in a hard disk using the magnetic heads 380_1 through 380_n.

Figure 5:
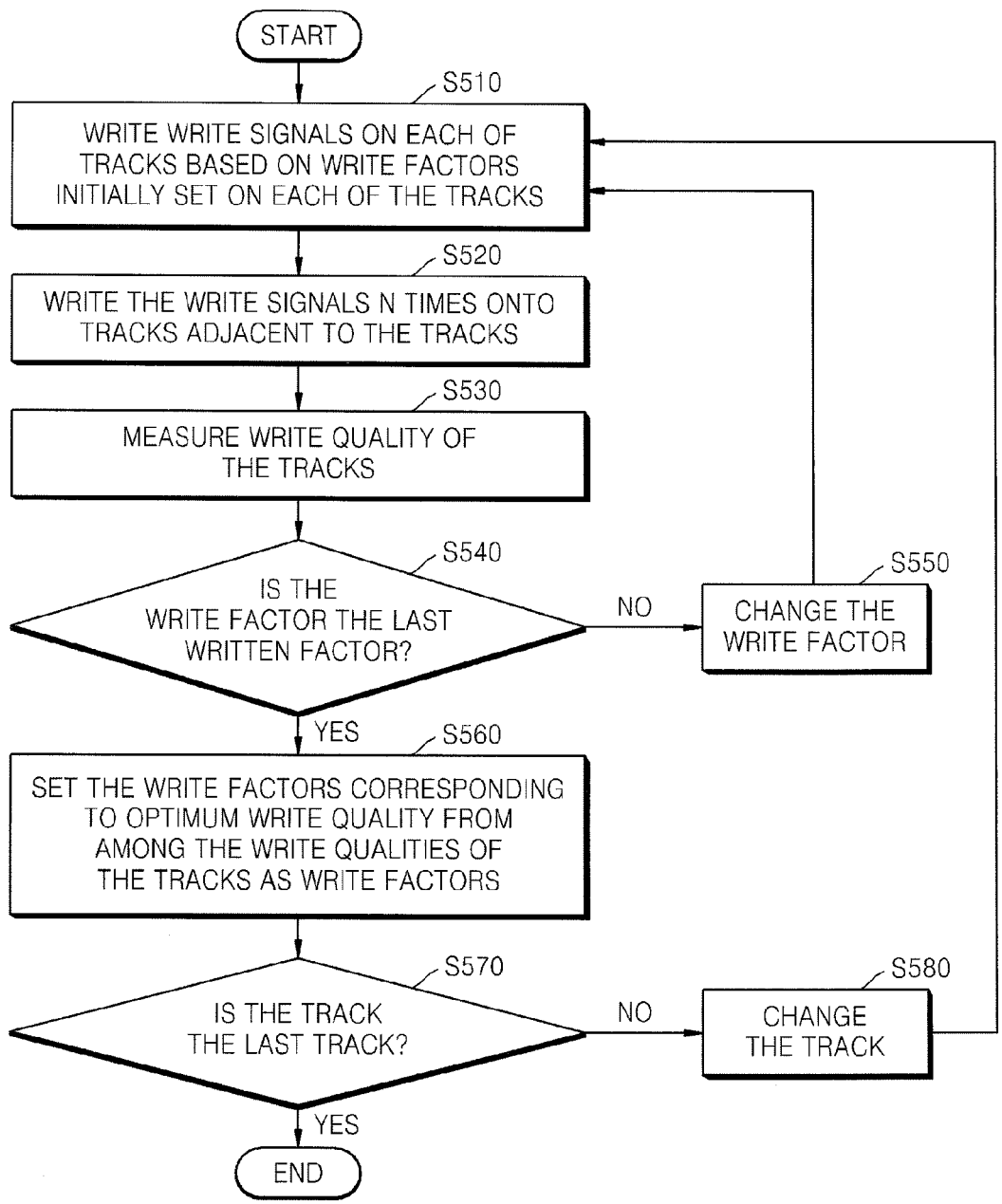
FIG. 5 is a flow chart of a method of separately setting a write factor of each head in a hard disk drive, according to another embodiment of the present general inventive concept.

FIG. 5 is a flow chart of a method of setting a write factor according to another embodiment of the present general inventive concept.

Referring to FIG. 5, the method of setting a write factor may include writing a write signal onto each track based on a preset write factor (operation S510), writing the write signals onto each of the tracks adjacent to the test track (operation S520), measuring write quality of each of the tracks (operation S530), changing the write factor (operation S550), and setting a write factor of each track to correspond to the optimum write quality from among the write qualities of the tracks (operation S560).

The method of setting a write factor according to an embodiment of the present general inventive concept can separately set the write factor of each of the tracks or can set the write factor of each zone that includes at least one track. That is, the plurality of tracks may be divided into a plurality of zones, wherein each zone includes at least one track, and a separate write factor may be set for each zone.

The method of setting a write factor according to another embodiment of the present general inventive concept is similar to the method of setting a write factor according to the previous embodiment except that a separate write factor may be set for each of the tracks. Therefore, one of ordinary skill in the art will be able to appreciate and understand the operation and methods of setting a write factor according to these other embodiments of the present general inventive concept by referring to the description and illustration of the previous embodiments, and thus, the detailed description thereof will not be repeated.

As described above, in methods of setting a write factor and a hard disk drive that uses the methods, the write factors may be separately set for each of the magnetic heads. Thus, the write factors that match the characteristics of each of the magnetic heads can be set, thereby increasing write quality.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of setting a write factor of a magnetic head in a hard disk drive, the method comprising:
   writing a write signal onto a test track based on a write factor initially set on the magnetic head;
   writing the write signal onto tracks adjacent to the test track;
   measuring the write quality of the test track;
   changing the write factor of the magnetic head in accordance with the write quality of the test track and repeating the writing of the write signal onto the test track based on the changed write factor; and
   setting the write factor of the magnetic head to correspond to an optimum write quality from among the measured write qualities of the test track.

2. The method of claim 1, wherein the tracks adjacent to the test track are located on both sides of the test track.

3. The method of claim 1, wherein the writing of the write signals onto the tracks adjacent to the test track comprises writing the write signals onto the tracks adjacent to the test track using the write factor initially set on the magnetic head.

4. The method of claim 1, wherein the writing of the write signals onto the tracks adjacent to the test track comprises writing the write signals N times on the tracks adjacent to the test track, where N is an integer greater than 2.

5. The method of claim 1, wherein the write factor is a write current.

6. The method of claim 5, wherein the repeating of the writing by changing the write factor comprises repeating the writing of the write signal onto the test track by increasing the write current.

7. The method of claim 1, wherein the write signal is a servo signal.

8. The method of claim 1, wherein the write quality of the test track is a bit error rate (BER).

9. A method of setting a write factor of a hard disk drive comprising a plurality of magnetic heads, the method comprising:
   writing a write signal onto a test track based on write factors initially set on each magnetic head;
   writing the write signals onto tracks adjacent to the test track;
   measuring the write quality of the test track;
   changing the write factor of each magnetic head in accordance with the write quality corresponding to each magnetic head and repeating the writing of the write signal onto the test track based on the changed write factors; and
   setting the write factor of each magnetic head to correspond to an optimum write quality selected from among the measured write qualities of each magnetic head.

10. The method of claim 9, wherein the write factor is changed by increasing or decreasing a write current based on a magnetization characteristic of each magnetic head.

11. The method of claim 9, wherein after the optimum write factor for one of the magnetic heads is set, the optimum write factors for the other magnetic heads are sequentially set.

12. The method of claim 9, wherein the write signals are simultaneously written to a plurality of test tracks using the plurality of magnetic heads.

13. A hard disk drive comprising:
   a plurality of magnetic heads to write write signals onto tracks based on a write factor corresponding to each magnetic head; and
   a plurality of write control units to respectively store the corresponding write factors of the magnetic heads,
   wherein, after writing the write signals onto a test track and onto tracks adjacent to the test track using each of the magnetic heads, the write factors of each magnetic head are set in accordance with a write quality of the test track, and the set write factors are stored in the corresponding write control units.

14. The hard disk drive of claim 13, wherein the write control units comprise resistors to store the write factors.

15. The hard disk drive of claim 13, wherein the write signals are simultaneously written onto a plurality of tracks based on the write factors of the magnetic heads, and wherein the write factors are different from each other.

16. A method of setting a write factor in a hard disk drive comprising a plurality of tracks, the method comprising:
   writing write signals onto each of the tracks based on a write factor initially set to the tracks;
   writing the write signals onto adjacent tracks;
   measuring a write quality of each track;
   changing the write factors in accordance With the measured write quality and repeating the writing of the write signals onto each of the tracks and adjacent tracks based on the changed write factors; and
   setting write factors of the tracks to correspond to an optimum write quality from among the write qualities of each track.

17. The method of claim 16, wherein the write factors are set in a plurality of zones and each zone comprises at least one track.

18. A method of setting a write factor of a magnetic head, the method comprising:
   writing a write signal onto a test track and at least one adjacent track based on a preset write factor of the magnetic head;
   measuring the write quality of the test track;
   adjusting the write factor of the magnetic head in accordance with the write quality of the test track; and
   setting the write factor of the magnetic head based on the adjusted write factor.

19. The method of claim 18, further comprising:
   repeating the writing of the write signal and the measuring of the write quality a predetermined number of times;
   wherein the adjusting of the write factor is performed after the write signal is written the predetermined number of times, and
   wherein the setting of the write factor corresponds to an optimum write quality selected from among the predetermined number of write quality measurements.

20. The method of claim 19, wherein the write factor is adjusted by increasing or decreasing a write current by a predetermined amount.

* * * * *